March 9, 1965 T. N. LOWRY 3,173,130

MEMORY CIRCUIT

Filed Aug. 8, 1960 2 Sheets-Sheet 1

INVENTOR
T. N. LOWRY
BY
S. E. Hollander
ATTORNEY

INVENTOR
T. N. LOWRY
BY
S. E. Hollander
ATTORNEY 3,173,130

MEMORY CIRCUIT

Terrell N. Lowry, Boonton, N.J., assignor to Bell Telephone Laboratories, Incorporated, New York, N.Y., a corporation of New York Filed Aug. 8, 1960, Ser. No. 48,175
19 Claims. (Cl. 340—173)

Figure 1:
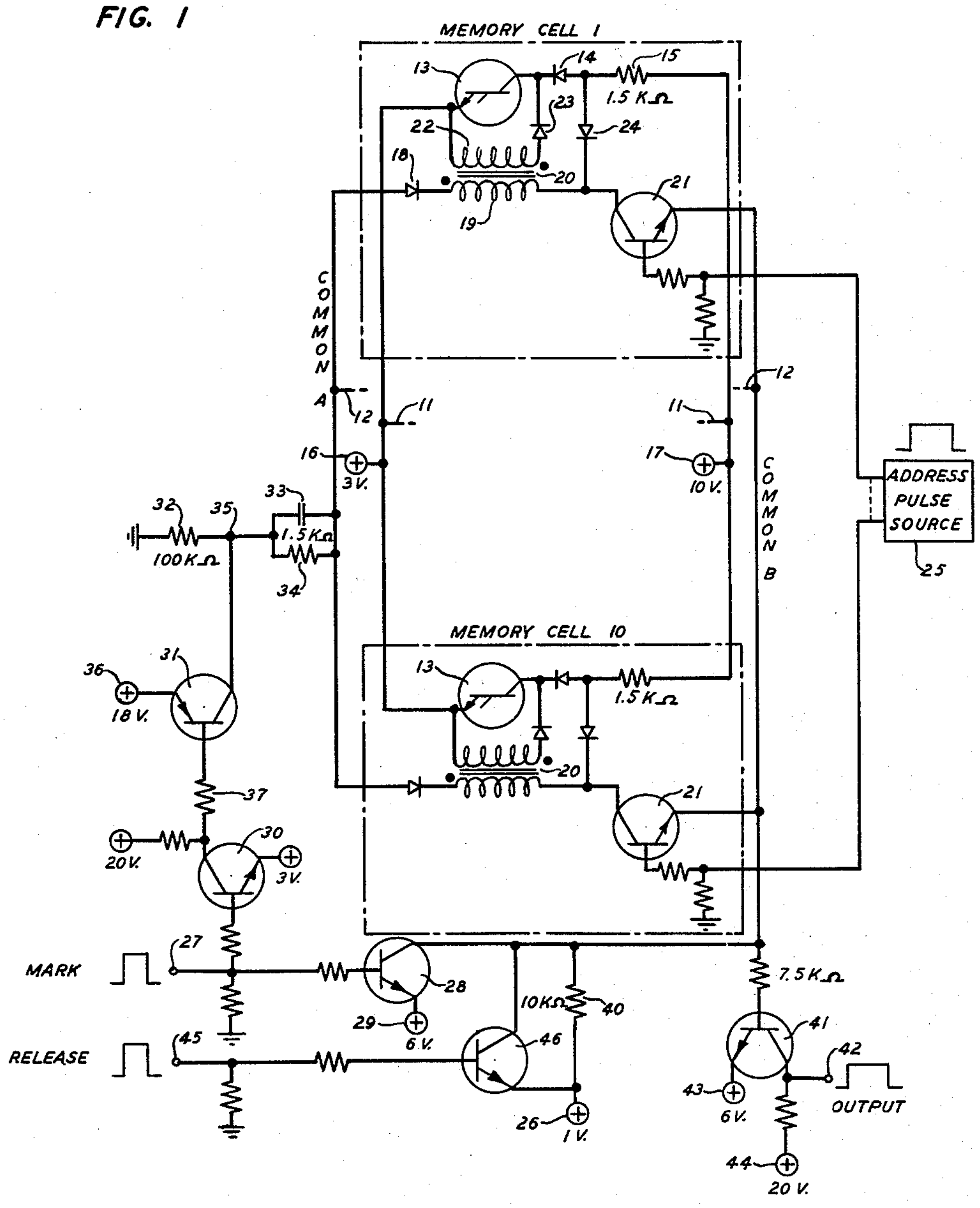

This invention relates to memory circuits and more particularly to memory circuits utilizing PNPN junction diodes as basic memory elements.

Multicell memory circuits are found especially useful in many types of electronic systems, for example, in computing systems and in telephone switching systems. In telephone switching systems incorporating remote line concentrator equipment for the economic utilization of a predetermined number of electrical connections between a central control office and a number of subscribers, it is desirable to provide multicell memory circuitry for remembering the prior use conditions of the individual connections to the central office. For example, such memory circuitry may be utilized as a means for obtaining change-of-condition signals for signaling a control center with regard to required switching functions. A comparison of the remembered condition of the connections and the present condition thereof may provide such a signal. When such a memory is positioned remote from the central office, its physical size, reliability, and life expectancy are especially important factors.

Circuitry positioned proximate to subscriber circuitry, rather than in a central office, should be compact and capable of being positioned in spaces of varying size which may be found available. To maintain the physical size of multicell memory circuitry as small as possible, it is desirable that the circuitry performing identical functions on all individual memory cells be common to all of those memory cells. For example, the control, output, and certain biasing circuitry should be common to all memory cells.

When, however, circuitry common to a number of memory cells is used for control and output purposes for cells individually responsive to peculiar external conditions such as the conditions of individual connections, the response of an operated cell may produce reactions at common points which adversely affect non-selected cells. It is therefore desirable that any memory circuitry of this type utilizing common control and output circuitry be so arranged that the response of selected operating cells is not reflected through the common circuitry to inappropriately operate non-selected circuitry.

To eliminate intercell interference and allow the use of common circuitry, various functional components may be arranged in a manner such that responses of operating cells are reflected at points individual to the operating cells, rather than common points. Where such arrangement is found impossible, elements may be provided for isolating the common points. However, the simple addition of a large number of isolating elements to an otherwise operational circuit to eliminate interference obviously defeats the requirement of compactness and usually reduces the reliability of a circuit designed without the additional elements in mind. The repair and replacement cost concomitant with the reduction of reliability in remote equipment normally offsets any advantages gained by the addition of the elements and the rearrangement of the circuit. It is therefore obvious that arrangements which eliminate intercell interference merely by the addition of a large number of isolating components and the rearrangement of certain circuitry in an otherwise operative memory arrangement are not the most satisfactory for use with remote concentrator equipment.

However, if in addition the various component portions of the memory circuitry are designed to perform a number of, rather than individual, functions, the over-all size of the circuitry may be so reduced that isolating elements may be utilized and the circuit may function reliably utilizing common functional components without intercell interference.

It is, therefore, an object of this invention to provide memory circuitry which may be utilized in a remote line concentrator for remembering the use condition of individual connections to a central office thereby facilitating the rapid interconnection of subscriber circuitry to an associated central office.

Another object of this invention is to provide multicell memory circuitry of compact physical dimensions capable of remote positioning in a telephone switching system.

A further object of this invention is to eliminate expensive maintenance of remotely positioned memory circuitry by increasing the reliability and operational life thereof.

A more specific object of this invention is to reduce the physical size of memory circuitry by utilizing common control and output circuitry to operate a number of associated cells.

An additional object of this invention is to eliminate intercell interference in a memory circuit utilizing common control, input, and output equipment.

Another object of this invention is to reduce the size of memory circuitry by combining various of the control functions required in multifunctional control circuitry.

Briefly, these objects are accomplished in accordance with aspects of this invention by an arrangement which utilizes a plurality of memory cells associated in parallel in a manner to utilize common sustaining, output, interrogation, marking, and release circuitry. Each cell comprises as a basic memory element a two-terminal PNPN diode associated in an individual sustain path between biasing potentials common to all of such sustain paths. By arranging the memory elements so that only the fixed value biasing points are common, operational responses of selected cells cannot be reflected through the sustain paths to affect non-selected ones of the memory elements.

Each cell also includes circuitry for accomplishing the control functions thereon substantially separate from the aforementioned sustain path and connected in common with all other such circuitry between first and second common control points. The circuitry within an individual cell for accomplishing the control functions thereon is separated into distinct portions for marking and releasing. This separation and that of the sustaining paths allow each distinct functional portion of a cell to carry current in but a single direction thereby facilitating the use of isolating diodes to eliminate intercell interference. The functional separation also allows an arrangement of paths such that access to each cell may be gained through a single transistor switch and currents through that switch flow in a direction to maintain the selection of the cell, once made.

Each cell includes a marking path connected between the first and second common control points and comprising a junction transistor operated as an access switch in series with a primary winding of a marking transformer and isolating circuitry. The secondary of the marking transformer is connected in series with an isolating diode across the PNPN memory device. The transformer has a turns ratio such as to provide a voltage "step-up" from the primary to facilitate the turn on or "marking" of PNPN memory elements within a wide tolerance range thereby to increase circuit reliability. The isolating means provided in the secondary circuit of each marking transformer eliminates overshoot and feedback therethrough. The windings of the marking transformers are so associated that marking currents are in the proper direction both to mark the PNPN diode and to pass the access switch without tending to turn off that switch.

A unidirectional direct-current path is provided between the sustain path of each memory cell and the access transistor thereof to provide a current which may be utilized to determined the condition of the individual cell. To make this determination output circuitry including a transistor amplifier is connected at the second common point to measure the direct current available upon the operation of the associated access switch. Thus, both the access and the interrogation functions are accomplished by the access transistor, eliminating the pulsing circuitry normally required for interrogation. The direct-current path is also, as mentioned, unidirectional in a manner to provide current flow on interrogation in the same direction through the access switch as on marking.

Marking of all memory cells is accomplished by common circuitry which provides an increase in voltage between the common control points and thus across the marking transformer of any cell to which access has been gained by the energization of its access switch. Release, on the other hand, is accomplished by switching circuitry which lowers the impedance to ground at the second common control point, the control point separated from the memory cells by the access switches. The operation of an access switch and the release circuitry shunts sustaining current from the sustaining path of the selected PNPN diode through the unidirectional direct-current path used for interrogation. The reduction of current therethrough causes the "marked" PNPN diode to revert to the high impedance or "released" state. Thus release, like interrogation, is accomplished by the flow of current through the unidirectional direct-current path in the proper direction for maintaining operated the access switch. Further, since the interrogation, release and output functions are accomplished at the second common point only, which point is separated from all cells by the access switches, none of the signals applied to accomplish these functions can affect more than the selected cell.

It is a feature of this invention that a memory circuit comprises a plurality of individual shunt associated memory cells utilizing common sustain, marking, release, and output circuitry.

Another feature of this invention relates to the connection of the memory elements in individual sustain paths between common biasing sources to eliminate direct intercell interference along sustaining paths.

A further feature of this invention relates to the intracell arrangement separating the control functions into unidirectional current paths and allowing the use of isolating diodes and a single access switch to facilitate the elimination of intercell interference along the control paths.

Another feature of this invention relates to the use of transformer means for marking memory cells to provide reliable marking of PNPN diodes of widely varying characteristics.

Another feature of this invention relates to the arrangement allowing the accomplishment of the access and interrogation functions by a single unit of multifunctional circuitry, a switching transistor.

An additional feature of this invention relates to the arrangement of the common output and control component circuitry at common points isolated from the memory cell responses to applied control signals.

Figure 2:
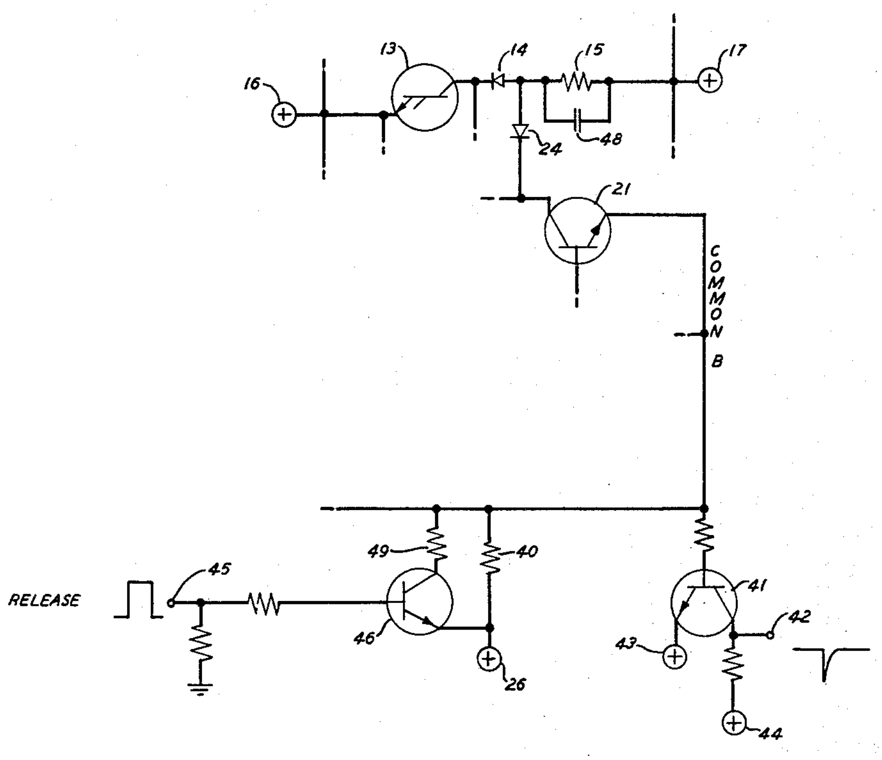

These and other objects and features of this invention may be better understood upon consideration of the following detailed description and the accompanying drawing in which:

FIG. 1 is a schematic diagram representative of a circuit illustrative of this invention; and FIG. 2 is a partial schematic diagram illustrating a modification to the circuit of FIG. 1.

Referring now to FIG. 1 there is shown a memory circuit including ten individual memory cells, only two of which (cells 1 and 10) are shown. The number of memory cells utilized in a specific memory arrangement depends on the number of circuits available (the use condition of which is to be remembered) for connecting subscribers to the central office or to other circuitry. Any number of additional memory cells which are required may be connected at terminals 11 and 12 to the common sustaining and control points, respectively. Since all of the cells include identical components, those intracell components will be identically numbered for ease of reference.

*Structure of the individual memory cells*

Each cell includes a two-terminal, four-layer, PNPN diode 13 such as that disclosed in W. Shockley Patent 2,855,524, issued October 7, 1958. As is well known, such diodes display a bistable operating characteristic, functioning in a high impedance condition for current therethrough of a value less than a predetermined value and in a low impedance condition for current therethrough greater than the predetermined value. It is also well known that to furnish initially the predetermined value of current requires the application of a relatively large voltage across the device, while to sustain the predetermined current and thus to sustain operation in the low impedance condition requires a small voltage relative to that required for initial breakdown. For example, one volt may be sufficient to maintain sustaining current through a PNPN diode which requires a 40-volt breakdown potential; such an exemplary element is assumed hereinafter.

Each diode 13 is connected in series with a diode 14 and resistor 15 between a first source of potential 16 and a second source of potential 17. It is to be assumed that whenever a source of potential is shown in the drawing as negative or positive, the other terminal thereof is connected to ground. The difference in the potentials furnished by the sources 16 and 17 is sufficient to provide voltage to sustain the diode 13 in the low impedance state but insufficient to switch the diode 13 to that state; for example, seven volts (as shown) may be provided. Since all of the individual cells 1–10 are connected to utilize common sustaining potentials the number of elements in the circuit is reduced. In contradistinction to prior art memory arrangements, however, only the fixed biasing points are common to the sustain paths; and the change of impedance condition of any diode 13 in response to an applied control pulse cannot be reflected through the sustaining paths to adversely affect other non-selected memory cells. For example, assuming that cell 1 is in the high impedance condition and cell 10 in the low impedance condition, the switching of the cell 10 to the high impedance condition in response to applied control signals cannot cause a change in potential between the sources 16 and 17 and thus across the diode 13 of cell 1.

The control and output functions for each cell are accomplished over control circuitry individual to the cells 1–10. Each control circuit is separated into unidirectional marking and release paths. The marking path includes a diode 18, a primary winding 19 of a marking transformer 20, and an access transistor 21, connected in series between a first electrically common control point A and a second electrically common control point B. The transformer 20 has its secondary winding 22 connected in series with a diode 23 across the PNPN diode 13 for marking the cell. The release and interrogation path includes a diode 24 which connects the sustain path to the access transistor 21. Each access transistor 21, which may be of the NPN junction type, is connected to a source of address pulses 25 which provides a pulse for operating a selected one of the transistors 21 in the saturated condition to complete the circuit thereby controlling current to flow between common points A and B through the control circuitry of the selected memory cell 1–10.

*Marking operation*

To "mark" any cell 1–10 (place the diode 13 thereof in the low impedance condition) in response to information received regarding the condition of the connecting circuitry, the following operation takes place. Access is gained to the desired cell by the application of an address pulse from the address pulse source 25. The cells are addressed in some non-coincidental order, such as consecutively, as determined by the address equipment; and a complete path is established through a single cell only, for example cell 1. Coincidentally with the application of the address pulse at the appropriate cell, a marking pulse is applied from a source of marking potential, not shown, to a terminal 27 and thus to the base of a marking transistor 28. The marking transistor 28 may be of the NPN junction type, as shown, and the marking pulse such as to saturate the transistor 28 to apply a fixed potential from a source of potential 29 to the common point B, priorly maintained at a potential furnished by a source 26. The marking pulse additionally is applied to saturate a normally off transistor 30, the drop in potential at the collector of which accomplishes the turn-on of a normally off transistor 31. The saturation of the transistor 31 provides a positive pulse from a source of potential 36 at a terminal 35 (normally maintained at ground by a resistor 32) which pulse is repeated at the common point A by means of a differentiating circuit including a capacitor 33 and a resistor 34.

Thus, upon the application of a marking pulse at the terminal 27, a positive pulse is applied at the common point A and a second lower value, positive pulse is applied at the common point B. For the sake of reliability, the difference in the potentials furnished by the sources 29 and 36 must be such as to provide voltage across the secondary winding 22 capable of marking a selection of diodes 13 having a relatively wide tolerance range about the average breakdown potential which may, for example, be 40 volts. Since the secondary voltage is a function of the input voltage at the primary winding 19 and the turns ratio of the transformer 20, a turns ratio of ten-to-one is sufficient with the exemplary input of approximately twelve volts furnished by the sources 29 and 36 to provide approximately 120 volts, for marking a selection of diodes 13 over an extremely wide tolerance range.

It is to be noted that transformer 20 provides a phase reversal from the primary winding 19 to the secondary winding 22 so that voltage across the diode 13 is of proper polarity for marking. The diode 23 is placed in the secondary circuit to preclude reaction at the common control points by controlling and eliminating reverse currents which might be caused by the collapse of the field of the transformer 20 on removal of the marking voltage or by the breakdown of the diode 13. The diode 18 affords additional protection by separating the marking transformers 20 from the common point A. As will be noted hereinafter, the diode 18 also protects against reaction at the common point A due to currents, other than the marking currents, by controlling and precluding reverse current flow in response to other control functions.

The operation of the differentiating circuit including the capacitor 33 and the resistor 34 is to be noted. When a marking pulse is applied at the terminal 35, the initial value thereof is applied by the capacitor 33 to the marking transformer 20. However, as the marking pulse continues, the charging of the capacitor 33 exponenitally reduces the marking potential. The charging is so timed by judicious component selection that upon the switching of the diode 13 to the low impedance condition, the marking voltage is materially less than first applied, and the secondary circuit does not carry excessive currents.

Once the diode 13 has been placed in the low impedance condition, the difference in the potentials furnished by the sources 16 and 17 sustains operation in that condition. Whereas in the high impedance condition substantially all of that difference is across the memory diode 13, in the low impedance condition only a small voltage, for example one volt, is thereacross. The foregoing difference in voltage across the memory diodes 13 in the two impedance conditions is utilized in the interrogating function to determine the impedance condition of the cells 1–10.

*Interrogation operation*

The interrogation of a cell 1–10 is accomplished in the following manner. Assuming, for example, that the cell 1 is in the high impedance condition, when an address pulse from the address pulse source 25 is applied to the access transistor 21 current flows from the higher level source 17 to the lower level source 26 by a path including the resistor 15, the diode 24, the access transistor 21, and a resistor 40. The off condition of the diode 13 precludes the flow of current therethrough to source 16, and the diode 18 prevents a flow to ground through the resistor 32 and isolates the common point A from the effect of interrogating currents. The resistance ratio of the resistors 15 and 40 is advantageously such that substantially all of the difference potential supplied by the sources 17 and 26 is across the resistor 40. This voltage is applied at the base of, and acts to saturate, an output transistor 41. Saturation thereof applies a voltage from a source 43 at the emitter to the collector terminal 42 which is normally maintained at a higher voltage level by a source 44. This drop in voltage level is interpreted by output circuitry connected to collector 42, not shown, as indicative of the high impedance condition of the cell 1.

On the other hand, when access is gained to the cell 1 during the low impedance condition thereof, the current diverted to the resistor 40 is insufficient to provide a voltage to operate the output transistor 41. The output circuitry connected at the terminal 42 interprets the high collector level as indicative of the low impedance condition of the interrogated cell 1.

Of especial note with respect to the interrogating function is the accomplishment thereof simply by addressing the appropriate cells 1–10 to gain access thereto. Thus the interrogating function is incorporated into and accomplished by the component circuitry required for accomplishing the access during all control functions. In this manner pulsing means and other circuitry normally associated with the interrogation of memory cells are eliminated, reducing the complexity of the circuit and increasing its reliability. In addition, the interrogation so provided is of a non-destructive type, desirable for the instant use with remote concentrator circuitry. It is to be noted, however, that the present circuitry may be utilized where destructive read-out of the remembered condition is desired. Such an operation will be discussed hereinafter with respect to the release function.

*Release operation*

The operation to release a marked cell is accomplished in much the same manner as interrogation. Access is gained to the appropriate one of the cells 1–10 by the operation of the access transistor 21 thereof under the control of the address pulse source 25. Coincidentally with the application of the access pulse, a release pulse is provided at a terminal 45 to saturate a transistor 46 and apply the potential of the source 26 (connected at the emitter thereof) to the common point B. The saturation of the transistor 46 provides an impedance to ground comparable to that through the memory diode 13 and substantially lower than that through the resistor 40. The provision of this low impedance path (through diode 24, transistor 21, and transistor 46) in shunt with the diode 13 of the selected memory cell 1 substantially reduces the current therethrough, lowering it below the sustaining level and causing the diode 13 to revert to the high impedance condition.

If it is desired to utilize the circuit of the invention to provide destructive read-out of the memory condition of the cells, a substantially identical arrangement illustrated in FIG. 2 may be utilized. In such a case the release circuitry may be utilized coincidentally with the access switch 21 to accomplish the interrogation function, and the output circuitry may be operated to receive output indications during the operation thereof rather than during the operation of an access transistor 21 alone, as in the normal arrangement. In such a case a capacitor 48 may be provided in parallel with the resistor 15 and a current-limiting resistor 49 inserted between common point B and the transistor 46 to provide the requisite signals for operating the output transistor 41. The capacitor 48 and resistor 49 provide that the voltage across resistor 15 (indicative of cell condition) is maintained for a period sufficient to provide an output signal before the cell is released.

*Circuit operation*

The circuit of the drawing functions in the following manner when used in a remote line concentrator system. Equipment, not shown, operating in conjunction with the address pulse source 25, functions to sequentially compare the state of the actual (physical) electrical path to the central office with the state of the memory cell representative thereof. This equipment interrogates the actual path and coincidentally operates the address pulse source 25 to provide an address pulse to the proper access transistor 21. The operation of the selected access switch 21 provides an output at the terminal 42 representative of the cell condition. Circuitry, not shown, connected at the terminal 42, compares the state of the interrogated cell with the actual state of the path as determined by the interrogation thereof. If the conditions are identical, no change-of-condition signal is produced and the sequential comparing circuitry steps to the next path and cell in the interrogation sequence.

On the other hand, if the comparison shows the path to be in actual use and the cell to be unmarked, a change signal is produced by the comparing circuitry. In such a case, the memory cell must be changed to the same condition as the present path condition so that later comparisons of the cell and path in the interrogation sequences will produce correct change signals. To accomplish this, access to the cell is maintained and a mark pulse is applied at the terminal 27 to place the interrogated cell in the condition representative of the "in use" condition of the path. Should the path be free and the cell in the marked condition, a release pulse is applied at the terminal 45 to shunt sustaining current from and release the interrogated cell. After accomplishing either mark or release to place the path and cell in identical conditions, the comparing circuitry steps to the next path and cell in the sequence to accomplish a like operation.

It is to be noted that all of the control functions are accomplished on each of the cells 1–10 by currents in the same direction through the access transistors 21. All of the control currents thus are in a direction tending to maintain the associated access transistor 21 in the operational condition. In addition, by separating the intracell control functions into circuits in which currents need flow in a single direction, isolating members such as diodes 14, 18, 23 and 24 may be provided to eliminate any affect of the operation of a diode 13 at the common control points A and B due to reaction through the control paths.

Of further note is the fact that all of the control functions except for the marking function have an effect at only the common point B, which point is separated from all memory cells 1–10 by intervening access transistors 21. This separation of the common point B from all of the cells 1–10 eliminates any affect that the control signals applied at the point B might have on non-selected cells. It is apparent that none of the control functions except marking have any affect at the common point A since the currents accomplished by the other functions are in a direction inappropriate to pass the isolating diodes 18.

The marking function which does affect the condition of the common point A is incapable also of inappropriately affecting non-selected cells. This follows since no path exists through the access transistors 21 of non-selected cells 1–10 and since the diodes 24 eliminate the other possible current paths through the marking transformers 20. In addition, the use of the marking transformers 20 and the concomitant voltage step-up reduces the primary voltage required for marking below that which might overcome the potentials maintaining the access transistors 21 in the off condition. As long as the base potential of an access transistor 21 is maintained below the value of the potential supplied by the source 26, marking pulses have no effect to inappropriately mark non-selected memory cells.

Thus the circuit of the present invention provides complete intercell isolation and security from interference through either the sustaining or the control paths of the cells while reducing the number of circuit components required to accomplish the given functions of the memory circuit. This is accomplished by the use of the multifunctional control circuitry of a simplified and reliable type. For example, the access transistors 21 alone accomplish the interrogation of all cells 1–10 in addition to the normal function of selecting the cell to be controlled.

It is to be understood that the above-described arrangement is merely illustrative of the application of the principles of this invention. For example, the component values given on the drawing are exemplary of but a single specific embodiment of the invention. In addition, though suggested for use in remote concentrator telephone circuitry, the invention may find numerous other applications. Additional arrangements may be devised by those skilled in the art without departing from the spirit and scope of the invention.

What is claimed is:

1. A memory circuit comprising a plurality of memory cells each including an element capable of operation in a high impedance condition and in a low impedance condition, means including a sustaining path for providing current to sustain the operation of said element in the low impedance condition, means including the marking path distinct from said sustaining path for providing current to place said element in the low impedance condition, means including a release and interrogating path for shunting current from said sustaining path, means for rendering current flow unidirectional in each of said paths, and access means connected to said marking path and to said release and interrogation path; output means connected in common to all of said access means; means for providing a marking signal connected in common to all of said marking paths and to all of said access means; and means for providing a release signal connected in common to all of said access means.

2. A memory circuit as in claim 1 wherein said means for providing current to sustain the operation of said element in the low impedance condition includes potential source means connected in common to all of said sustaining paths.

3. A circuit for remembering the use condition of conductors for connecting telephone subscriber circuits to central office equipment comprising a plurality of devices capable of operation in a high impedance condition and in a low impedance condition, a plurality of paths each individually connected with one of said devices, potential source means common to all of said paths for providing current to sustain the operation of said devices in the low impedance condition, a plurality of circuit means each individually connected with one of said devices to control the current in said path associated therewith, each of said circuit means including current-controlling means, output means connected in common to all of said circuit means, and control signal means connected in common to all of said circuit means for providing selected signal currents therein.

4. A circuit for remembering the use condition of conductors for connecting telephone subscriber circuits to central office equipment comprising a plurality of devices capable of operation in a high impedance condition and in a low impedance condition, a plurality of paths each individually connected with one of said devices, potential source means common to all of said paths for providing current to sustain the operation of said devices in the low impedance condition, a plurality of circuit means each individually connected with one of said devices to control the current in said path associated therewith, each of said circuit means including current-controlling means, output means connected in common to all of said circuit means, and control signal means connected in common to all of said circuit means for providing selected signal currents therein, said circuit means each including a marking circuit associated with said device for increasing the current in said sustaining path, and a release and interrogating path connecting said sustaining path to said marking circuit for reducing the current in said sustaining path.

5. A circuit as in claim 4 wherein said current-controlling means includes a single means for controlling signal access to the associated one of said devices and for determining the condition thereof.

6. A circuit as in claim 5 wherein said single means comprises a transistor connected between said output means and said marking circuit and said release and interrogating path.

7. A circuit as in claim 4 wherein said control signal means is connected in common to all of said circuit means at a first common point and at a second common point; said current-controlling means includes unidirectional current means connected in said marking circuit and in said release and interrogating path, and access means connected to said second common point; and wherein said marking circuit includes a first winding connected to said first common point and to said access means, and a second winding inductively associated with said first winding and connected to said device.

8. A circuit as in claim 7 wherein said control signal means includes means for applying a pulse between said first common point and said second common point, and means for providing a low impedance path at said second common point.

9. A memory cell comprising a device capable of operation in a high impedance condition and a low impedance condition, first circuit means connected to said device for sustaining the operation thereof in the low impedance condition; second circuit means associated therewith for varying the current through said device in response to external stimuli, said second circuit means including a first unidirectional current path including a first winding, a second unidirectional current path connected to said device including a second winding inductively associated with said first winding, and a third unidirectional current path connecting said first circuit means to said first unidirectional current path; output means connected to said first current path; and control means connected to said first current path for increasing the current in said first path and for increasing the current in said third path.

10. A memory cell comprising a two-terminal PNPN diode; means for sustaining the operation of said diode in the low impedance condition including a first source of potential, a second source of potential, and a first resistor and a first diode connecting said PNPN diode in series between said first and said second sources; means for switching said PNPN diode to the low impedance condition including a transformer having a secondary winding connected across said PNPN diode and a primary winding, pulse source means, and circuit means including a second diode connecting said pulse source means across said primary winding; means for determining the condition of said PNPN diode including a third source of potential, a second resistor, a third diode connecting said second resistor in series between said third source of potential and said first resistor, and output means connected to operate responsive to the voltage across said second resistor; and means for switching said PNPN diode to the high impedance condition including means connected in parallel with said second resistor for reducing the impedance from said first resistor to said third source of potential.

11. A memory cell as in claim 10 wherein said means for sustaining the operation of said PNPN diode in the low impedance condition includes a capacitor connected in shunt with said first resistor.

12. A memory cell as in claim 10 further comprising a transistor switch connected between said second resistor and said third diode and in series with said primary winding.

13. A memory circuit comprising a plurality of two-terminal PNPN diodes; a source of sustaining potential; a plurality of unidirectional sustaining circuit means each connecting an individual one of said PNPN diodes to utilize current from said source of sustaining potential to maintain operation in the low impedance condition; a plurality of control circuit means connected between a first common point and a second common point, each of said control circuit means being individually associated with one of said PNPN memory diodes and comprising a transformer having a primary winding connected in a first unidirectional path to said first common point and a secondary winding connected across said associated PNPN diode, a transistor access switch connected to said primary winding and to said second common point, and a second unidirectional path connecting said sustaining circuit means and said transistor access switch; means for measuring the current at said second common point including means for providing biasing potentials at said first and second common points; and control pulse signaling means connected to said first and second common points.

14. A memory circuit as in claim 13, wherein each of said plurality of unidirectional sustaining circuit means further comprises means for momentarily maintaining the associated one of said PNPN diodes in the prior condition thereof upon the application of control pulse signals.

15. A memory circuit as in claim 13 wherein said control pulse signaling means comprises a means for increasing the voltage between said common points, and a means for providing a low impedance path at said second common point.

16. A memory circuit as in claim 15 wherein said means for increasing the voltage between said common points comprises a source of marking pulses, a first source of marking potential, a marking transistor operative responsive to pulses from said source of marking pulses to connect said first source of marking potential to said second common point, a second source of marking potential, a capacitor, and transistor switching means operative responsive to pulses from said source of marking pulses to apply said second source of marking potential through said capacitor to said first common point; wherein said means for providing biasing potentials at said common points includes a first source of biasing potential, a resistor connected in shunt with said capacitor between said first source of biasing potential and said first common point, and a second source of biasing potential resistively connected to said second common point; and wherein said means for providing a low impedance path at said second common point comprises a source of release pulses, and a release transistor responsive to pulses from said source of release pulses to connect said second source of biasing potential directly to said second common point.

17. A memory circuit comprising a plurality of bistable memory cells, common sustaining means connected to all of said cells, a single means in each of said cells for gaining access thereto, circuit means arranging all of said cells between first and second common points, and common marking, release, and output means connected to said first and second common points, said marking and said release means being operable simultaneously with said single access means.

18. A memory circuit comprising a plurality of memory cells having first and second operational conditions, common addressing means for selectively delivering signals to any of said cells, common marking means for placing selected ones of said cells in said first operational condition upon the delivery thereto of correspondingly selected ones of said signals from said common addressing means, common releasing means for placing selected ones of said cells in said second operational condition upon the delivery thereto of correspondingly selected ones of said signals from said common addressing means, and common output means for nondestructively determining the operational condition of said selected ones of said cells in response to said signals from said common addressing means.

19. A memory circuit in accordance with claim 18 further including first, second and third common potential means, and wherein each of said cells includes a PNPN diode for passing current from said first common potential means to said second common potential means when a particular one of said cells is in said first operational condition, and wherein said common releasing means includes means for shunting said current from said first common potential means to said third common potential means to place said particular one of said cells in said second operational condition.

References Cited in the file of this patent

UNITED STATES PATENTS

| | | |
|---|---|---|
| 2,907,000 | Lawrence | Sept. 29, 1959 |
| 2,938,194 | Anderson | May 24, 1960 |
| 2,974,310 | Russell | Mar. 7, 1961 |